June 1, 1937.　　S. P. MILLER ET AL　　2,082,174
REENFORCED PIPE SHIELD
Filed April 26, 1933
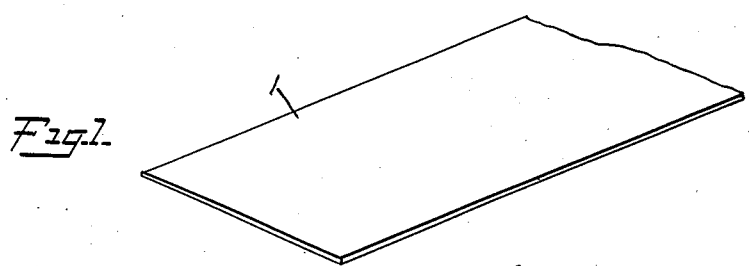
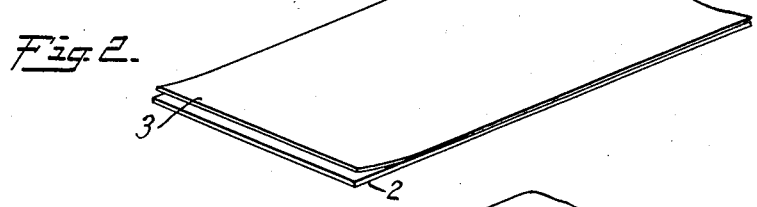
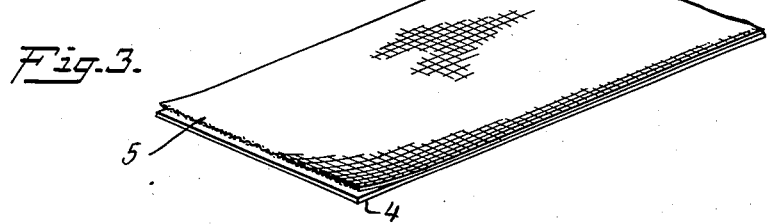
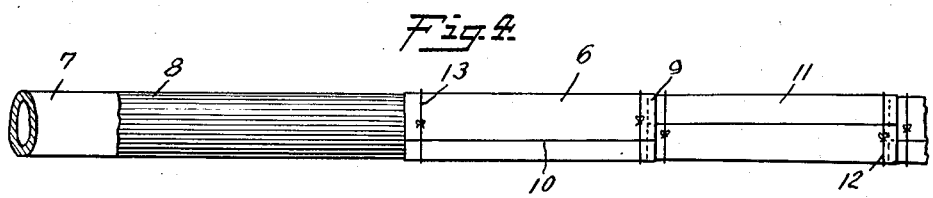
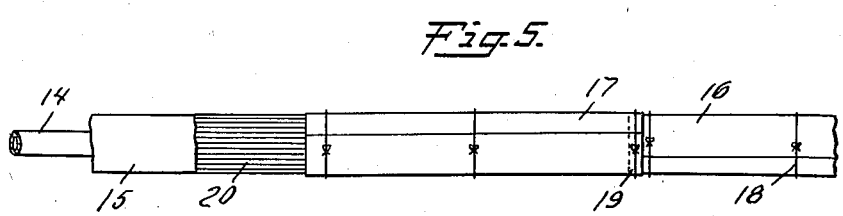
INVENTOR
Stuart Parmelee Miller
Leslie T. Sutherland
BY
ATTORNEY Patented June 1, 1937

2,082,174

UNITED STATES PATENT OFFICE 2,082,174

REENFORCED PIPE SHIELD

Stuart P. Miller, Englewood, N. J., and Leslie T. Sutherland, Yonkers, N. Y., assignors to The Barrett Company, New York, N. Y., a corporation of New York Application April 26, 1933, Serial No. 667,976

6 Claims. (Cl. 154—2)

This invention relates to the protection of metallic or other articles subject to oxidation, corrosion, or deterioration, and is especially concerned with the fabrication and application of a shielding material for protecting pipe lines either above ground, where they may be exposed to atmospheric oxidation or corrosion, or under ground where they may be subjected to the action of corrosive subsurface waters, electrolysis, and other injurious agencies.

Owing to the corrosive action of various substances present in the atmosphere or in the soil, pipe lines, especially those of iron or steel, are subject to rapid deterioration. The life of unprotected pipes varies, depending upon the particular conditions to which they are subjected. Numerous factors may take part in the corrosive or erosive action and the rate of deterioration may be the resultant of a number of these factors acting together. Thus, with underground pipe lines the effect of alkaline or acid substances in the water which reaches the pipe by seepage, and the effect of electrolysis and ground currents or other agencies may be such that a pipe will have a relatively short useful life. If the pipes are coated with protective coatings such as bituminous enamel or the like, the effect of soil stresses frequently is such as to remove or damage the enamel at one or more points and expose the pipe to the destructive actions mentioned. If the pipe is exposed to the atmosphere, the composition of the gases, water, etc., contacting with it may be such that the pipe rapidly deteriorates and must be replaced long before replacement would ordinarily be necessary.

Pipes (whether of iron, steel, other metal, concrete, wood, or other material) which are to be used under such unfavorable conditions are frequently provided with a protective film of bituminous enamel, paint, or varnish, but such films are more or less readily removed by the abrasive or other action of materials with which the pipe comes in contact. Even a small abrasion in the protective film will permit the ingress of injurious substances to the metal walls of the pipe with consequent deterioration thereof. In order to prevent such localized corrosion, it is essential that the continuity of the protective film or coating be preserved. With buried pipes this is especially difficult since, although the pipes may be laid with the greatest possible care, subsequent soil stresses may deform and abrade the protective coating with resultant exposure of portions of the metal pipe. By soil stresses, we mean those agencies of motion in a soil which exert mechanical forces, almost entirely of a disadvantageous nature, against anything placed or buried in the soil. In such a category would be classed—

1. Destructive effects of back fill striking against material being buried;
2. Settling of soil;
3. Expansion and shrinkage effect produced in soil by
   a. Wetting and drying
   b. Freezing and thawing;
4. Earth vibrations and slides;
5. Motion of heavy substances, as rock, etc., thrown on soil;
6. The suction of quicksands, colloidal clays, mud, e. g., "gumbo mud".

In order to prevent the rapid deterioration of pipe lines, such lines have been coated with bituminous enamel or other protective coating and the coated pipe wrapped with saturated porous material, such as tar- or asphalt-saturated rag or asbestos felt. Such wrappings, while providing a considerable degree of protection, have not proven to be entirely satisfactory for protecting the coating because of insufficient resistence to the shifting of the soil, and other destructive agencies.

An "enamel" is a coating composition which consists of liquid, or semi-liquid, coating material, such as paint, varnish, lacquer, bituminous substances, etc., in which there may have been incorporated, or in which may naturally occur, comparatively large amounts of inert fillers, for example, pigments, powdered minerals, etc. Enamels are usually applied without use of thinners or solvents. They are preferably applied over prime coats of bituminous paints, varnishes, etc. The choice of filler, and amount used, is such that special properties are imparted to the resultant product which— a. Permit building up of thick coating film;
b. Act as mechanical reenforcing agents;
c. Inhibit cold flow of coating material;
d. Permit application and retention on the coated object of sufficient coating material to impart high lustre and smoothness; and e. Insure even color effect.

Bituminous pipe coating enamels may be grouped as follows:

1. Natural asphalts
2. Petroleum asphalts  } with or without added fillers
3. Coal tar pitches It is an object of the present invention to provide a substantially impervious reenforcing pipe shield of light weight, resistant to tearing and puncture, which will more efficiently protect exposed or buried pipe lines against destructive influences, particularly those of a mechanical nature, than has hitherto been possible.

Further objects will appear from the following description.

The shielding material of this invention comprises a sheet of fibrous material, such as paper, felt, woven or knitted cloth, wood veneer or the like, impregnated with a resin, such, for example, as a condensation product of formaldehyde and a phenol, such as phenol, cresols, xylenols, or mixtures thereof. Any resin imparting to the base sheet imperviousness, hardness, and resistance to tearing or puncture while yielding a sheet suitable for application in the described ways may be employed as the impregnating agent. Preferably, however, the phenol-formaldehyde resins disclosed in the Baekeland patents, Nos. 942,852; 949,671; 1,019,406; and 1,019,407, are used to impregnate a roofing felt base. Thus, a flexible, substantially impervious shield is formed. A sheet of felted material, for instance roofing felt or paper, may be impregnated with the condensation product in any desired manner, and then subjected to heat and pressure to form a homogeneous and substantially impervious sheet. Such a sheet will be flexible, durable, and impervious. It can consequently be wrapped in any suitable manner around the pipe to be protected. Instead of felt, other materials capable of saturation with the condensation product, such as a woven fabric, for example canvas, muslin, etc., may be used.

If desired, the shields may be built up of a number of laminations of impregnated materials either similar or dissimilar materials being used for different laminations; but if the shield is to be applied by a wrapping process, the thickness of the pipe shield should not be increased to such an extent that its flexibility will be materially impaired. The degree of flexibility required will, of course, vary for different sizes of pipes, and the shields for pipes of large diameter may consequently, if desired, be thicker than those for pipes of small diameter.

Resin-impregnated shields may also be made preformed to fit specific pipe sizes, or partially preformed to give a generally cylindrical set to the shield material. In the former case, the shields may be made in sections, each of which fits partially around the pipe, and substantially no flexibility is required. In the latter case, less flexibility is necessary than when the shields are made in the form of flat sheets or ribbons, but some degree of flexibility is desirable to permit application to pipes of varying diameter. In the latter case, also, continuous sheets or ribbons of shield material may be made and shipped in roll form.

According to the present invention, there is applied to a base sheet impregnated in the above manner, a reenforcing element which serves to give additional strength and other desirable qualities to the shield. Various materials may be used for this purpose, such as woven or knitted fabrics, nettings, muslin and other textiles, loose fibres or threads, felted materials, such as paper, roofing felt, asbestos felt, etc., wire cloth or screen, woven or sheet asbestos, wood veneer, or other materials which are capable of bonding firmly with the resin-impregnated base. The reenforcement may be thoroughly impregnated with the resin and affixed to the impregnated base, or an unimpregnated backing may be affixed to the impregnated base. Reenforced shields are better adapted to the rough handling which may be incurred prior to, or during their application to the pipes to be protected. If chipping or cracking of the body portion of the shield does occur, the reenforcing element tends to prevent the separation of the fractured or chipped portions of the shield at the points of fracture. This chipping or cracking will not materially affect the protective capacity of the shield as long as the loose portions remain in place. Reenforcing elements may be applied either to one or to both sides of the impregnated base portion of the pipe shield.

The shield may, if desired, be applied to the pipe with the unimpregnated backing contacting with the protecting coating or the pipe walls. The shield may then be cemented to the pipe by means of an adhesive, for example, an enamel or pitch applied to either the pipe or backing or both, and while the adhesive is still plastic, wrapping the shield about the pipe. The unimpregnated fabric makes a stronger bond with the adhesive than would the resin-impregnated base portion.

When an unimpregnated fabric, which may be netted, woven, or felted or composed of loose fibres or threads, is used as the reenforcing element, the shield may be applied to the pipe to be protected so that the reenforcing fabric is exposed. In this case, if desired, the reenforcing or backing fabric may be treated with a fungicide, such as creosote oils or the like, to preserve it and prevent destruction by mold or other micro-organisms.

If desired, an unimpregnated reenforcing fabric, such as cheesecloth, may be included between two layers of impregnated material and the assembly made inseparably adherent by the application of heat and pressure. Conversely, an impregnated ply may be placed between plies of unimpregnated fabric and the plies united.

If an impregnated reenforcing element is employed, it may be applied on either side of the impregnated base or where the shield is composed of a number of plies, it may be included as any one of these plies. For instance, an impregnated fabric, such as felt or woven fabric, may be inserted between two layers of impregnated felt and subsequently compressed to form a unitary structure.

Instead of an impregnated reenforcing element, wire cloth, metal sheeting, or other metal reenforcing element may be applied to one side of the impregnated base, or may be utilized to reenforce a multiple-ply shield. In the latter case, the metal reenforcing element may be applied to either side of the shield or may be incorporated as an inner layer or ply.

In making the reenforced shield, the reenforcing material, either impregnated or unimpregnated, may be applied to the impregnated base material prior to curing of the same. The composite structure may then be subjected to the necessary heat and pressure for the curing operation whereby the reenforcing element is firmly bonded thereto.

The impregnated base, however, may be cured first and then coated with a powdered fusible resin. The reenforcement may be applied to this coating and affixed by means of heat and pressure. By varying the amount of fusible resin applied, the reenforcing member may be impregnated to any desired degree. For instance, if the base portion is very thinly coated with the fusible resin, the reenforcing member will be firmly bonded to the base, but little or no impregnation thereof will result. By more liberal application of the resin to the base sheet, the reenforcing member may be partially or completely impregnated.

If the pipe shield material is to be used, stored or handled where it is exposed to excessive radiant heat, as for example, bright sunlight in hot climates, in accordance with this invention, a shield having a light colored surface may be utilized to prevent undue absorption of heat and consequent excessive softening of the enamel with attendant liability to damage. In such cases, a light colored pigment may be applied to the shield or the reenforcing material may be of a light color, preferably white, the shields being applied to the pipe line with the light colored side outermost. Shields may also be employed with a reenforcing layer on the side nearest the article to be protected and an additional light colored coating applied to the impregnated base element of the shield. A light colored pigment may be used for this purpose or a metallic surface may be provided. For example, in the production of the shields, flaked bronzing powders, such as aluminum powder, may be applied to the impregnated felt, as by dusting aluminum thereon, prior to the curing process; or after the curing process either the impregnated or unimpregnated felt may be treated with a solution of the resin, dried, and then coated with the bronzing powder. On subsequent application of heat and pressure, the metal particles become firmly bonded to the hardened resin and provide a light metallic surface which greatly retards absorption of radiant energy.

The pipe shields of the present invention have been found especially advantageous for the shielding of preservative coatings or protective films, such, for example, as the bituminous enamel films with which pipe lines are frequently covered. By wrapping the shields of the invention around such articles, the paint or other protective film is protected indefinitely from scratches and bruises and particularly against deformation resulting from soil movement which would otherwise permit the ingress of injurious substances to the more reactive metal surfaces.

The pipe shields of this invention may be applied to heat insulated piping, and when thus applied, afford a weatherproof and durable protection for the insulation. They likewise may be used upon other metallic or non-metallic articles for which such a protective wrapping is desired.

While pipe coating in the field may be carried out by various methods of procedures, a typical operation may be as follows:

The separate lengths of pipe may be united into a complete line, on supports alongside the trench, by welding or coupling. Loose scale and free dirt may be removed from the surface of the pipe. A priming coat, consisting of bituminous material and thinner, may then be applied. After a suitable time of drying, the molten enamel may be poured about the pipe and smoothed. When this cools, the protective shield may be wrapped about the finished job. Preferably, the impregnated portion of the shield will be adjacent the enamel and will not be cemented to it. The line of pipe may be picked up by cranes, moved out over the trench and beginning with the pipe end may be slowly lowered into the trench. The back-fill may then be dumped over the pipe. The shield exerts several functions, i. e., 1. Minimizes plastic flow of the enamel resulting from soil pressure;
2. Prevents puncture of enamel and subsequent corrosion;
3. Prevents stripping off of enamel, e. g., by action of excessively adherent soils such as "gumbo".

The smooth, slippery surface of the resin-impregnated surface of the shields is advantageous because material contacting with the pipe shields will tend to slide off and be deflected, minimizing puncture of the shields. Further, the relatively slight freedom of movement between the shield and the pipe results in the shield bearing the stresses set up by the settling or shifting of the soil, thereby protecting the enamel.

In the preferred embodiments illustrated in the drawing, the invention is shown incorporated in a pipe covered with shields of this invention and the present description will be confined to the present illustrated embodiments of the invention. It will be understood, however, that the novel features and improvements are susceptible of other applications, such, for example, as covering metal surfaces, both coated and uncoated. Hence, the scope of this invention is not confined to the embodiments herein described.

Our invention may be more fully understood from the following description of several specific embodiments thereof, taken in connection with the accompanying drawing, in which—

Fig. 1 shows a fragment of a pipe shield which does not have a backing or reenforcing layer;

Figs. 2 and 3 show fragments of reenforced pipe shields constructed in accordance with our invention;

Fig. 4 shows one method of applying the shielding material to a pipe line; and

Fig. 5 shows the shielding material applied to a pipe covered with heat insulating material.

With reference to Fig. 1 of the drawing, the shield indicated by the reference numeral 1 may be prepared by impregnating paper or felt material, preferably the usual roofing felt, in any suitable manner with a resin. For example, the base sheet may be saturated with a solution consisting of phenol-formaldehyde condensation product in an intermediate stage of curing and a suitable solvent by either a batch or a continuous process of saturating. Plasticizers may be added to the condensation product to impart greater flexibility to the final product. The saturated sheet may then be heated, for example to a temperature of about 200° F., to drive off the solvent, and thereafter subjected to heat and pressure in a platen press to obtain the final product. As the saturant for the fibrous base, a resin may be used which is made from tar acids (phenols) and reactive methylene compounds, with or without added plasticizer. The tar acids may be phenol, cresols, xylenols, etc., or mixtures thereof. The condensing agent used and the proportions of ingredients adopted may be so chosen as to yield resins of the permanently fusible or infusible type. After impregnation, the saturant resins may be cured by heat or heat and pressure to any desired degree.

Examples of saturant resins are:

I—Infusible type

|  | Percent by weight |
|---|---|
| (a) Phenol | 70 |
| Paraformaldehyde | 24 |
| 20% sodium hydroxide solution | 1 |
| Plasticizer | 5 |
|  | 100 |
| (b) Cresol | 80 |
| Formaldehyde (40% solution) | 19 |
| 20% sodium hydroxide solution | 1 |
|  | 100 |

II—Fusible type

|  | Percent by weight |
|---|---|
| (c) Phenol | 80 |
| Formaldehyde (40% solution) | 19 |
| Sulphuric acid (added as 20% solution) | 1 |
|  | 100 |

As base materials, various types of roofing felt have been found satisfactory. Different felts are adapted to different uses. Where maximum pliability and toughness are required, a high cotton rag content is desirable; such a felt may contain about 75 percent cotton rag and weigh 20 pounds per 480 square feet.

Instead of phenol-formaldehyde resins, other resins, such as tar-acid-furfural resins, polybasic-acid-polyhydric alcohol resins, and urea-formaldehyde resins, may be utilized. The curing treatment of the saturated sheet may be conducted at temperatures of from about 190° F. to about 375° F. and at a pressure of from about 50 pounds to about 3,000 pounds per square inch, for a period of from ¼ minute to 10 minutes.

As one example of the procedure followed for the production of the pipe shield of this invention, the following is given:

An absorbent felt of 0.034 inch thickness and 34 pounds per 480 square feet was saturated with a solution of phenolic-formaldehyde intermediate condensation product, having approximately 3 parts by weight of a phenol to approximately 1 part by weight of formaldehyde. The resultant saturated sheet, after heating to drive off the solvent was subjected to a pressure of about 1,000 pounds per square inch at a temperature of about from 320° to 360° F. for approximately 3 minutes. There was thus formed a flexible impervious sheet substantially homogeneous throughout and having a hard, tough, substantially impervious surface.

Shields prepared as described above may be wrapped around coated or uncoated pipes or other articles and will provide durable protection therefor. Preferably, however, a reenforcing or backing element is applied to the impregnated sheet. In the drawing, Fig. 2 shows such a reenforced shield comprising a layer of resin-impregnated felt 2 and an unimpregnated felt backing 3. The impregnated felt may be prepared as hereinabove described. The reenforcing element may then be applied by coating the impregnated base 2 with a liquid condensation product of a phenol and formaldehyde. After the coating is permitted to dry somewhat, the backing 3 is superposed thereon and subjected to heat and pressure to convert the condensation product to an insoluble and infusible condition. Either the impregnated felt layer 2 may be coated with condensation product and the unimpregnated felt reenforcing element 3 superposed thereon, or conversely, the backing 3 may be coated and the base portion 2 superposed thereon, the two sheets being united by heat and pressure. Powdered fusible solid resin may be spread in desired amount on the unimpregnated or impregnated base, the backing applied thereover, and the layers pressed between hot platens to cure the resin and join the layers. In all cases, a durable bond will be formed between the plies 2 and 3 and the laminated structure will form an integral shield. A hard, non-absorbent paper of about 0.015 inch thickness and 15 pounds weight per 480 square feet is well suited for use as the backing 3.

Instead of applying the reenforcing element to the felt containing the hard cured resin product, the reenforcing element may be applied to the impregnated felt material prior to the curing operation. Upon the subsequent subjection of the composite structure to heat and pressure, the resin is converted to infusible form and at the same time a permanent bond is formed between the two layers.

In Fig. 3 there is shown a reenforced product comprising a layer of impregnated felt 4 and a reenforcing element 5. In this case, the reenforcing element 5 is composed of threads or wires, such as loose threads, cotton cloth, wire cloth, or netting. The reenforcing element 5 may be either impregnated or unimpregnated and may be affixed to the impregnated felt base 4 in the manners hereinabove described in connection with the affixing of the backing 3 to the impregnated base 2.

To produce a shield having a light-colored surface, a light-colored backing, such as white cheesecloth or light-colored felt, may be affixed to the resin-impregnated base, or a coating of light-colored pigment, such as bronzing powder, may be applied thereto. Uncoated roofing felt is relatively light in color compared with bituminous enamel and its capacity to absorb radiant heat is correspondingly lower and it may be used as a backing for the pipe shield. If a pigment is used it may be dusted onto the surface of the impregnated felt base prior to the curing process. In this case the subsequent heat and pressure treatment serves to bind the pigment firmly to the surface of the impregnated felt. Other methods of affixing the coating may be used. For instance, the surface to be coated may be treated with a solution of resin. It has been found, for example, that by first saturating the felt sheet with a 20% to 50% solution of phenol-formaldehyde resin in a 50-50 alcohol-benzol solvent, drying the saturated sheet, and then dusting the dried sheet with aluminum powder or flakes, and subjecting the dusted sheet to heat and pressure, a satisfactory bonding of the metal to the felt is obtained.

In applying the shield of our invention to pipes or other articles, it may be desirable to bond the shielding material to the article by means of an adhesive or cement. In such case, any composition which will form a bond between the surfaces without being injurious thereto may be used. For the application of the shields to articles, such for example as enameled pipes, a pitch or asphalt cement or any of the various types of pipe coating enamel may be used. If the shields are to be applied to an insulating material as in the case of the protection of heat insulated piping, an adhesive, which may also serve as a water-proofing compound, may be employed as the adhesive for securing the shield to the insulating material, e. g., asphalt, or coal tar plastic cement.

Whether or not an adhesive is employed in the application of the shields of our invention, it is only necessary that the shields be wrapped firmly about the article so that no parts subject to injury are exposed. In Fig. 4, we have shown one method of employing the pipe shields of our invention for the protection of a pipe line. This figure shows a modification of the pipe shield of our invention which is especially adapted for use on pipe lines subject to radiant heat. The pipe shield material comprises a body portion of impregnated felt having affixed to one side thereof a reenforcing layer of unimpregnated felt and having on the other side thereof a coating of aluminum powder 6. In applying the pipe shield, the pipe 7 to be protected is first given an adherent coating of inert waterproof material, such as mica-pitch composition described in United States Patent No. 1,773,131, granted August 19, 1930, or other enamel 8. This coating is preferably permitted to solidify before the pipe shield is applied. The coated pipe may then be covered with the shields which are applied so that the aluminum surface 6 is exposed. The shields may be applied in the form of relatively long sheets wrapped about the pipe with contiguous edges of adjacent shields overlapping as indicated by the reference numeral 9. The shields may be of a length somewhat greater than the circumference of the pipe so as to provide for overlapping of the ends as indicated by reference number 10, or two or more shorter shields may be applied with the ends overlapping and the shields completely covering the pipe.

If desired, an adhesive may be applied to the shield or to the pipe, or to both, so as to form a good bond between the pipe coating and the pipe shield. If the adhesive used bonds better with the unimpregnated backing than with the impregnated base, it is preferable, when securing the shields by means of such adhesive, to provide the shield with an unimpregnated layer, such as cheesecloth, and to apply the shield with the unimpregnated layer contacting with the pipe. Clamps, tapes, or other securing means, such as ties 12 and 13, may be provided at intervals to hold the shields firmly in place.

In Fig. 5, the pipe 14 has a layer of heat insulation 15 of well known type about which are tightly wrapped shields 16, 17, each of which is securely fastened in place by means of cords or bands 18 before the succeeding sheet is applied. Each sheet may be lapped over the end of the preceding sheet a sufficient amount, as at 19, to prevent exposure at these joints and may be wrapped once or more than once around the pipe. If desired, a layer 20 of plastic adhesive may be employed to secure the shielding material more firmly to the insulation. A water-resistant adhesive may be used for this purpose in which case additional protection is afforded to the insulation.

Because of the impervious nature of the shield, coatings on the pipes or other articles will not be subjected to rapid erosion, such as usually results when no covering is provided. The protection afforded to the pipe is consequently increased and the life of the pipe, and in the case of insulated pipes, the life of the insulation thereon, is correspondingly lengthened. Further, due to the dielectric properties of the shields of this invention, their hardness and greater resistance to wear, abrasion, puncture and tearing, and greater tensile strength, particularly as compared with the usual felt covering used for buried pipe lines, the coatings of such pipes when covered with the shields of this invention are more effectively protected against abrasion due to shifting of the soil or other causes and the pipes themselves are consequently more effectively protected.

The application of reenforced pipe shields to pipes with the backing exposed results in a structure possessing many advantages, among the most important of which may be mentioned the following:

(a) The utilization of a light-colored backing provides a shield that reflects heat, resulting in lowered temperatures in the neighborhood of the pipe coating than would otherwise be possible;

(b) The backing cushions the resin-impregnated shield proper against breaks and punctures; and (c) The shield may be more readily applied to the pipe due to the protection afforded the resin-impregnated layer by the backing.

It is to be understood that this invention is not restricted to the present disclosure otherwise than as defined by the appended claims.

We claim:

1. The method of protecting pipe lines which comprises coating the external surface of the pipe with a waterproofing composition and thereafter covering the coated pipe with a flexible, substantially impervious shield consisting of a fibrous base impregnated with a resin imparting a hard, tough surface to the shield, and a backing secured to the impregnated fibrous base, said hard, tough surface being imparted to the shield prior to application of the shield to the pipe.

2. A pipe having a bituminous waterproof coating on the exterior surface thereof and a shield covering said coating, said shield comprising an unimpregnated sheet and a resin-impregnated sheet secured together, the unimpregnated sheet being disposed in contact with the coating on the pipe and the impregnated sheet having a coating of metallic flakes thereon.

3. The method of protecting pipe lines which comprises coating the external surface of the pipe with a waterproofing composition, thereafter wrapping the coated pipe with a flexible substantially impervious shield constituted of a fibrous base impregnated with a phenolic resin imparting a hard tough surface to the shield and a backing secured to the impregnated fibrous base, said resin being cured and imparting a hard tough surface to the shield prior to the application of the shield to the pipe.

4. A pipe line having a protection on the exterior surface thereof, said protection comprising a flexible shield wrapped around the pipe, said flexible shield comprising a fibrous base impregnated with a resin imparting a hard, tough surface to the shield prior to the application of the shield to the pipe and a backing secured to the impregnated fibrous base.

5. A pipe having a waterproof coating layer on the exterior surface thereof and a flexible shield wrapped around said coating, said flexible shield comprising a fibrous base impregnated with a resin imparting a hard, tough surface to the shield prior to the application of the shield to the pipe and a backing secured to the impregnated fibrous base.

6. A pipe line having a waterproof coating layer on the exterior surface thereof and a flexible shield wrapped around said coating, said flexible shield comprising a plurality of plies of fibrous material, at least one of said plies being impregnated with a resin imparting a hard, tough surface to the shield prior to application of the shield to the pipe and at least one of said plies of fibrous material being constituted of asbestos felt.

STUART P. MILLER.
LESLIE T. SUTHERLAND.